(12) United States Patent
Cui et al.

(10) Patent No.: US 11,797,896 B2
(45) Date of Patent: Oct. 24, 2023

(54) AUTONOMOUS AERIAL VEHICLE ASSISTED VIEWING LOCATION SELECTION FOR EVENT VENUE

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Sameena Khan, Peachtree Corners, GA (US); Troy Paige, Buford, GA (US); Ari Craine, Marietta, GA (US); Robert Koch, Peachtree Corners, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 78 days.

(21) Appl. No.: 17/107,721

(22) Filed: Nov. 30, 2020

(65) Prior Publication Data
US 2022/0172127 A1 Jun. 2, 2022

(51) Int. Cl.
*G06Q 10/02* (2012.01)
*G06F 3/0482* (2013.01)
(Continued)

(52) U.S. Cl.
CPC ........... *G06Q 10/02* (2013.01); *B64C 39/024* (2013.01); *B64D 47/08* (2013.01); *G05D 1/0088* (2013.01);
(Continued)

(58) Field of Classification Search
CPC .. G06Q 10/02; G06Q 30/0201; B64C 39/024; B64C 2201/027; B64C 2201/127;
(Continued)

(56) References Cited

U.S. PATENT DOCUMENTS

| 5,295,551 | A | 3/1994 | Sukonick |
| 5,636,123 | A | 6/1997 | Rich et al. |

(Continued)

FOREIGN PATENT DOCUMENTS

| CN | 105278759 B | 1/2016 |
| CN | 107945103 A | 4/2018 |

(Continued)

OTHER PUBLICATIONS

"Jogging with a Quadcopter" exertiongameslab.org (Apr. 18, 2015); http://exertiongameslab.org/wp-content/uploads/2011/07/quadcopter_chi2015.pdf.

(Continued)

*Primary Examiner* — Nasim N Nirjhar

(57) ABSTRACT

A processing system including at least one processor may collect, via at least one camera of at least one autonomous aerial vehicle, viewing information for a plurality of positions for each of a plurality of viewing locations within an event venue. The processing system may next present a viewing location selection interface to a user, where the viewing location selection interface provides a simulated view with respect to at least one of the plurality of positions for at least one of the plurality of viewing locations, and where the simulated view is based upon the viewing information that is obtained. The processing system may then obtain a selection from the user of a viewing location of the plurality of viewing locations for an event at the event venue.

20 Claims, 4 Drawing Sheets

(51) Int. Cl.
    *H04R 1/08*               (2006.01)
    *G06Q 30/0201*        (2023.01)
    *B64D 47/08*             (2006.01)
    *G05D 1/00*              (2006.01)
    *B64C 39/02*             (2023.01)
    *H04N 23/695*          (2023.01)
    *G06V 20/17*             (2022.01)
    *G05D 1/10*              (2006.01)
    *B64U 10/13*             (2023.01)
    *B64U 101/30*          (2023.01)

(52) U.S. Cl.
    CPC ......... *G05D 1/0094* (2013.01); *G06F 3/0482* (2013.01); *G06Q 30/0201* (2013.01); *G06V 20/17* (2022.01); *H04N 23/695* (2023.01); *H04R 1/08* (2013.01); *B64U 10/13* (2023.01); *B64U 2101/30* (2023.01); *G05D 1/101* (2013.01)

(58) Field of Classification Search
    CPC .... B64D 47/08; G05D 1/0088; G05D 1/0094; G05D 1/101; G06F 3/0482; G06V 20/13; H04N 5/23299; H04R 1/08
    See application file for complete search history.

(56) References Cited

U.S. PATENT DOCUMENTS

| | | |
|---|---|---|
| 7,415,331 B2 | 8/2008 | Dapp et al. |
| 7,451,023 B2 | 11/2008 | Appleby et al. |
| 7,737,878 B2 | 6/2010 | Van Tooren et al. |
| 8,914,182 B2 | 12/2014 | Casado et al. |
| 8,948,935 B1 | 2/2015 | Peeters et al. |
| 9,169,030 B2 | 10/2015 | Wong et al. |
| 9,317,034 B2 | 4/2016 | Hoffman et al. |
| 9,405,181 B2 | 8/2016 | Wong et al. |
| 9,464,907 B1 | 10/2016 | Hoareau et al. |
| 9,523,986 B1 | 12/2016 | Abebe et al. |
| 9,567,077 B2 | 2/2017 | Mullan et al. |
| 9,691,285 B2 | 6/2017 | Jarrell |
| 9,713,675 B2 | 7/2017 | Levien et al. |
| 9,720,519 B2 | 8/2017 | Verma |
| 9,754,496 B2 | 9/2017 | Chan et al. |
| 9,760,087 B2 | 9/2017 | Hoareau et al. |
| 9,798,329 B2 | 10/2017 | Shattil |
| 9,835,709 B2 | 12/2017 | Tran et al. |
| 9,848,459 B2 | 12/2017 | Darrow et al. |
| 9,854,206 B1 | 12/2017 | Ren et al. |
| 9,861,075 B2 | 1/2018 | Shen et al. |
| 9,896,202 B2 | 2/2018 | Jourdan |
| 9,940,525 B2 | 4/2018 | Wolf |
| 9,943,965 B2 | 4/2018 | Moore |
| 9,977,428 B2 | 5/2018 | Hall |
| 9,984,579 B1 | 5/2018 | Harris et al. |
| 9,986,378 B2 | 5/2018 | Jones |
| 10,050,760 B2 | 8/2018 | Ross et al. |
| 10,073,336 B2 | 9/2018 | Maes et al. |
| 10,155,166 B1 | 12/2018 | Taylor et al. |
| 10,159,218 B2 | 12/2018 | Shen et al. |
| 10,203,701 B2 | 2/2019 | Kurdi et al. |
| 10,254,766 B2 | 4/2019 | High et al. |
| 10,269,257 B1 | 4/2019 | Gohl et al. |
| 10,274,952 B2 | 4/2019 | Cantrell et al. |
| 10,308,430 B1 | 6/2019 | Brady et al. |
| 10,313,638 B1 | 6/2019 | Yeturu et al. |
| 10,325,506 B2 | 6/2019 | Goddemeier et al. |
| 10,331,124 B2 | 6/2019 | Ferguson et al. |
| 10,332,394 B2 | 6/2019 | Gomez Gutierrez et al. |
| 10,354,537 B2 | 7/2019 | Beaurepaire et al. |
| 10,372,122 B2 | 8/2019 | Zach |
| 10,440,229 B2 | 10/2019 | Drako |
| 10,441,020 B1 | 10/2019 | Andon et al. |
| 10,453,345 B2 | 10/2019 | Greenberger et al. |
| 10,467,885 B2 | 11/2019 | Trundle et al. |
| 10,481,600 B2 | 11/2019 | Yen et al. |
| 10,501,180 B2 | 12/2019 | Yu |
| 10,565,395 B2 | 2/2020 | Matusek et al. |
| 10,586,464 B2 | 3/2020 | Dupray et al. |
| 10,600,326 B2 | 3/2020 | Kim et al. |
| 10,607,462 B2 | 3/2020 | Drako |
| 10,636,297 B2 | 4/2020 | Wang et al. |
| 10,643,406 B2 | 5/2020 | Arya et al. |
| 10,654,482 B2 | 5/2020 | Urano et al. |
| 10,655,968 B2 | 5/2020 | Rezvani |
| 10,672,278 B2 | 6/2020 | Deluca et al. |
| 10,676,022 B2 | 6/2020 | Zevenbergen et al. |
| 10,683,088 B2 | 6/2020 | Erickson et al. |
| 10,706,634 B1 | 7/2020 | Baumbach et al. |
| 10,748,429 B2 | 8/2020 | Bosworth |
| 10,761,544 B2 | 9/2020 | Anderson et al. |
| 10,762,795 B2 | 9/2020 | Contreras et al. |
| 10,762,797 B2 | 9/2020 | Navot et al. |
| 10,765,378 B2 | 9/2020 | Hall et al. |
| 10,818,187 B2 | 10/2020 | Perko |
| 2005/0259150 A1 | 11/2005 | Furumi et al. |
| 2007/0288132 A1 | 12/2007 | Lam |
| 2015/0202770 A1 | 7/2015 | Patron et al. |
| 2015/0242763 A1* | 8/2015 | Zamer .................... G06T 11/60 705/5 |
| 2015/0269258 A1 | 9/2015 | Hunt, Jr. |
| 2015/0350614 A1 | 12/2015 | Meier et al. |
| 2016/0214717 A1 | 7/2016 | De Silva |
| 2016/0246297 A1 | 8/2016 | Song |
| 2016/0373699 A1 | 12/2016 | Torres et al. |
| 2017/0081026 A1 | 3/2017 | Winn et al. |
| 2017/0278409 A1 | 9/2017 | Johnson et al. |
| 2017/0291608 A1 | 10/2017 | Engel et al. |
| 2017/0368413 A1 | 12/2017 | Shavit |
| 2018/0035606 A1 | 2/2018 | Burdoucci |
| 2018/0072416 A1 | 3/2018 | Cantrell et al. |
| 2018/0136659 A1 | 5/2018 | Matloff |
| 2018/0162504 A1 | 6/2018 | Lindsø |
| 2018/0232580 A1 | 8/2018 | Wolf |
| 2018/0259960 A1 | 9/2018 | Cuban et al. |
| 2018/0308130 A1 | 10/2018 | Hafeez et al. |
| 2019/0035128 A1 | 1/2019 | Russell |
| 2019/0051224 A1 | 2/2019 | Marshall et al. |
| 2019/0052852 A1 | 2/2019 | Schick et al. |
| 2019/0058852 A1* | 2/2019 | Viswanathan ... H04N 21/43637 |
| 2019/0061942 A1 | 2/2019 | Miller |
| 2019/0112048 A1 | 4/2019 | Culver |
| 2019/0135450 A1 | 5/2019 | Zhou et al. |
| 2019/0185158 A1 | 6/2019 | Blake et al. |
| 2019/0196577 A1* | 6/2019 | Sronipah ................ G06F 30/00 |
| 2019/0197254 A1 | 6/2019 | Salgar |
| 2019/0227557 A1 | 7/2019 | Kim et al. |
| 2019/0238338 A1 | 8/2019 | Obrien et al. |
| 2019/0294742 A1* | 9/2019 | Zhao ................ G01M 11/0221 |
| 2019/0324456 A1 | 10/2019 | Ryan et al. |
| 2019/0339712 A1 | 11/2019 | Williams et al. |
| 2019/0369641 A1 | 12/2019 | Gillett |
| 2019/0377345 A1 | 12/2019 | Bachrach et al. |
| 2020/0014759 A1 | 1/2020 | Wunderlich |
| 2020/0032484 A1 | 1/2020 | ODonnell |
| 2020/0042013 A1 | 2/2020 | Kelkar et al. |
| 2020/0043347 A1 | 2/2020 | Wartofsky |
| 2020/0066147 A1 | 2/2020 | Vadillo et al. |
| 2020/0066163 A1 | 2/2020 | Emsbach et al. |
| 2020/0082731 A1 | 3/2020 | Choi et al. |
| 2020/0094964 A1 | 3/2020 | Myslinski |
| 2020/0103882 A1 | 4/2020 | Sullivan et al. |
| 2020/0130827 A1 | 4/2020 | Kozak |
| 2020/0145619 A1 | 5/2020 | Drako |
| 2020/0183384 A1 | 6/2020 | Noh et al. |
| 2020/0207371 A1 | 7/2020 | Dougherty et al. |
| 2020/0250848 A1 | 8/2020 | Kim et al. |
| 2020/0262450 A1 | 8/2020 | Pan |
| 2020/0265701 A1 | 8/2020 | Schenker et al. |
| 2020/0265723 A1 | 8/2020 | Gordon et al. |
| 2020/0273353 A1 | 8/2020 | Oconnell et al. |
| 2020/0341471 A1 | 10/2020 | Kozak |

(56) References Cited

U.S. PATENT DOCUMENTS

2020/0356115 A1   11/2020  Kubie
2020/0357288 A1   11/2020  Stewart et al.

FOREIGN PATENT DOCUMENTS

| | | |
|---|---|---|
| EP | 3525157 A1 | 8/2019 |
| EP | 3667451 A1 | 6/2020 |
| KR | 102160722 B1 | 9/2020 |
| TW | I693959 B | 5/2020 |
| WO | 2016210156 A1 | 12/2016 |
| WO | 2017055080 A1 | 4/2017 |
| WO | 2017065107 A1 | 4/2017 |
| WO | 2017068224 A1 | 4/2017 |
| WO | 2017157863 A1 | 9/2017 |
| WO | 2018052352 A1 | 3/2018 |
| WO | 2019006769 A1 | 1/2019 |
| WO | 2019235667 A1 | 12/2019 |
| WO | 2020057887 A1 | 3/2020 |
| WO | 2020072387 A1 | 4/2020 |

OTHER PUBLICATIONS

"Joggobot: A Flying Robot as Jogging Companion" exertiongameslab. org (May 5, 2012); https://exertiongameslab.org/wp-content/uploads/2011/07/joggobot_chi2012.pdf.

Al Zayer, Majed, et al. "Exploring the use of a drone to guide blind runners." Proceedings of the 18th International ACM SIGACCESS Conference on Computers and Accessibility. 2016. https://rrl.cse.unr.edu/media/documents/2016/p263-al-zayer.pdf.

Alshareef, Hazzaa N., and Dan Grigoras. "An adaptive task scheduler for a cloud of drones." 2018 4th International Conference on Cloud Computing Technologies and Applications (Cloudtech). IEEE, 2018.

Altawy, Riham and Youssef, Amr. M. "Security, Privacy, and Safety Aspects of Civilian Drones: A Survey," researchgate.net. ACM Transactions on Cyber-Physical Systems, Nov. 2016.

Amato, Andrew, "Projector Drone Turns Any Surface Into a Video Screen," DRONELIFE.com, dronelife.com, Jun. 26, 2014.

Bertram, Joshua R., Peng Wei, and Joseph Zambreno. "Scalable FastMDP for Pre-departure Airspace Reservation and Strategic De-conflict." arXiv preprint arXiv:2008.03518 (2020).

Blank, Peter; Kirrane, Sabrina; and Spiekerman, Sarah. "Privacy-Aware Restricted Areas for Unmanned Aerial Systems," computer. org. IEEE Security & Privacy. Mar./Apr. 2018, pp. 70-79, vol. 16.

Brock, Anke M., et al. "Flymap: Interacting with maps projected from a drone." Proceedings of the 7th ACM International Symposium on Pervasive Displays 2018.

Bui, Khac-Hoai Nam, and Jason J. Jung. "Internet of agents framework for connected vehicles: A case study on distributed traffic control system." Journal of Parallel and Distributed Computing 116 (2018): 89-95.

Cameron, Lori. "Building a Framework to Protect Your Privacy from Drones," computer.org. Accessed: Nov. 10, 2020. IEEE Computer Society, (2020).

Choi, Han-Lim, Luc Brunet, and Jonathan P. How. "Consensus-based decentralized auctions for robust task allocation." IEEE transactions on robotics 25.4 (2009): 912-926.

Colley, Ashley, et al. "Investigating drone motion as pedestrian guidance." Proceedings of the 16th International Conference on Mobile and Ubiquitous Multimedia. 2017.

Frias-Martinez, Vanessa, Elizabeth Sklar, and Simon Parsons. "Exploring auction mechanisms for role assignment in teams of autonomous robots." Robot Soccer World Cup. Springer, Berlin, Heidelberg, 2004.

Irfan, Muhammad, and Adil Farooq. "Auction-based task allocation scheme for dynamic coalition formations in limited robotic swarms with heterogeneous capabilities." 2016 International Conference on Intelligent Systems Engineering (ICISE). IEEE, 2016.

Isop, W., Pestana, J., Ermacora, G., Fraundorfer, F. & Schmalstieg, D. (2016). Micro Aerial Projector—stabilizing projected images of an airborne robotics projection platform. 5618-5625. 10.1109/IROS. 2016.7759826.

Kamali, Maryam, et al. "Formal verification of autonomous vehicle platooning." Science of computer programming 148 (2017): 88-106.

Lee, Eun-Kyu, et al. "Internet of Vehicles: From intelligent grid to autonomous cars and vehicular fogs." International Journal of Distributed Sensor Networks 12.9 (2016): 1550147716665500.

Lucien, Laurent, et al. "A proposition of data organization and exchanges to collaborate in an autonomous agent context." 2016 IEEE Intl Conference on Computational Science and Engineering (CSE) and IEEE Intl Conference on Embedded and Ubiquitous Computing (EUC) and 15th Intl Symposium on Distributed Computing and Applications for Business Engineering (DCABES). IEEE, 2016.

Minaeian, S., Liu, J., & Son, Y. (2018). Effective and Efficient Detection of Moving Targets From a UAV's Camera. IEEE Transactions on Intelligent Transportation Systems, 19, 497-506. 10.1109/TITS.2017.2782790.

Pongpunwattana, Anawat, and Rolf Rysdyk. "Real-time planning for multiple autonomous vehicles in dynamic uncertain environments." Journal of Aerospace Computing, Information, and Communication 1.12 (2004): 580-604.

Porfiri, Maurizio, D. Gray Roberson, and Daniel J. Stilwell. "Tracking and formation control of multiple autonomous agents: A two-level consensus approach." Automatica 43.8 (2007): 1318-1328.

Raboin, Eric, et al. "Model-predictive asset guarding by team of autonomous surface vehicles in environment with civilian boats." Autonomous Robots 38.3 (2015): 261-282.

Scheible, J. Funk, M. (2016). In-Situ-DisplayDrone: Facilitating co-located interactive experiences via a flying screen. In Proceedings of the 5th ACM International Symposium on Pervasive Displays (PerDis '16). Association for Computing Machinery, 251-252. 10.1145/2914920.2940334.

Scheible, Jurgen, et al. "Displaydrone: a flying robot based interactive display." Proceedings of the 2nd ACM International Symposium on Pervasive Displays. 2013.

Schneider, Eric, et al. "Auction-based task allocation for multi-robot teams in dynamic environments." Conference Towards Autonomous Robotic Systems. Springer, Cham, 2015.

Xiang, Xianbo, Bruno Jouvencel, and Olivier Parodi. "Coordinated formation control of multiple autonomous underwater vehicles for pipeline inspection." International Journal of Advanced Robotic Systems 7.1 (2010): 3.

Yaacoub, Jean-Paul et al. "Security analysis of drones systems: Attacks, limitations, and recommendations," ncbi.nlm.nih.gov. Internet of Things. Sep. 2020. 11: 100218.

Yu, Jun, et al. "iPrivacy: image privacy protection by identifying sensitive objects via deep multi-task learning." IEEE Transactions on Information Forensics and Security 12.5 (2016): 1005-1016.

Zhu, Guodong, and Peng Wei. "Pre-departure planning for urban air mobility flights with dynamic airspace reservation." AIAA Aviation 2019 Forum. 2019.

\* cited by examiner

AUTONOMOUS AERIAL VEHICLE ASSISTED VIEWING LOCATION SELECTION FOR EVENT VENUE

The present disclosure relates generally to autonomous aerial vehicle operations, and more particularly to methods, computer-readable media, and apparatuses for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, drones or autonomous aerial vehicles (AAVs) are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained. For instance, in one example, a processing system including at least one processor may collect, via at least one camera of at least one autonomous aerial vehicle, viewing information for a plurality of positions for each of a plurality of viewing locations within an event venue. The processing system may next present a viewing location selection interface to a user, where the viewing location selection interface provides a simulated view with respect to at least one of the plurality of positions for at least one of the plurality of viewing locations, and where the simulated view is based upon the viewing information that is obtained. The processing system may then obtain a selection from the user of a viewing location of the plurality of viewing locations for an event at the event venue.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
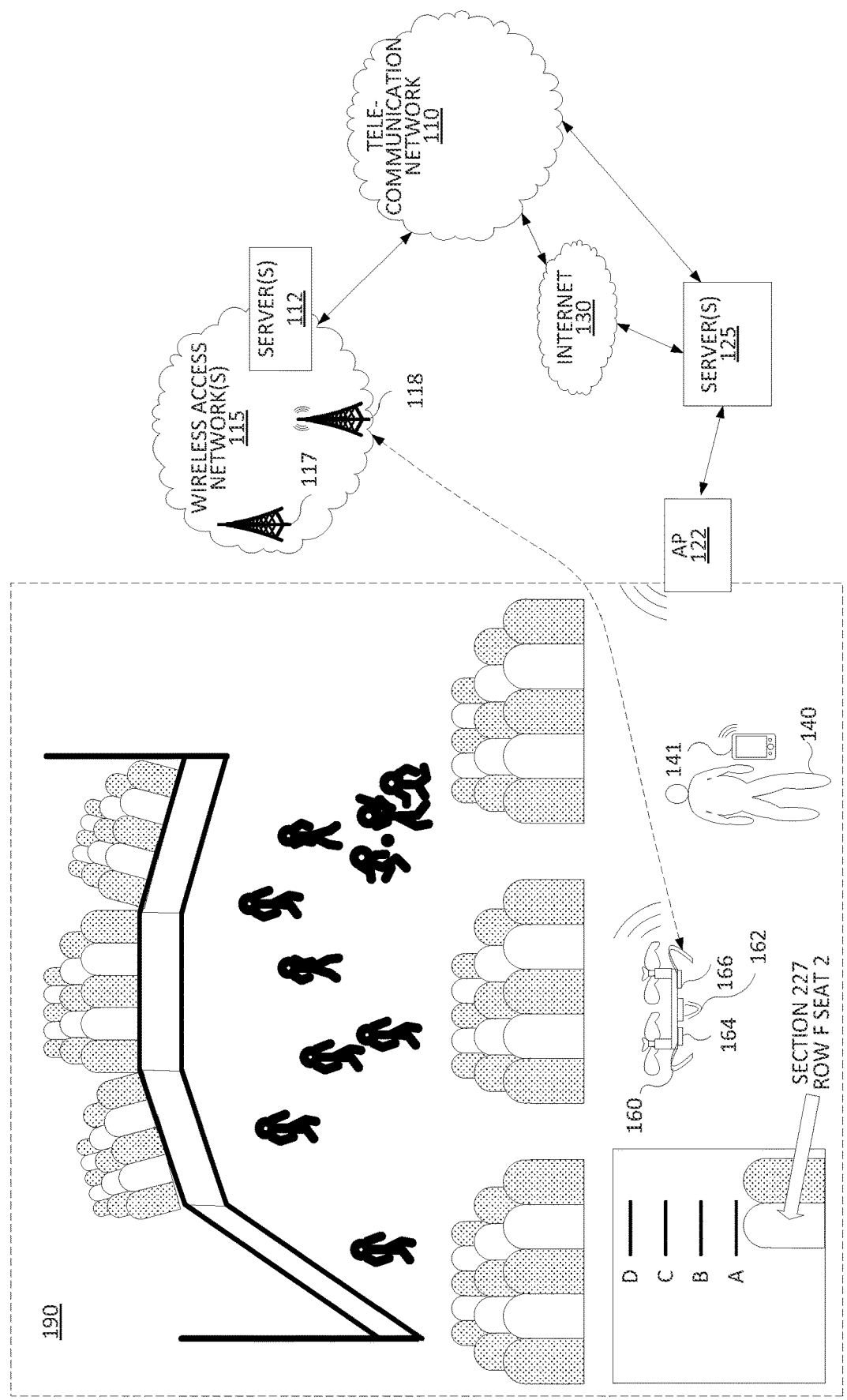
FIG. 1 illustrates an example system related to the present disclosure.

Examples of the present disclosure describe methods, computer-readable media, and apparatuses for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained. In particular, examples of the present disclosure relate to an autonomous aerial vehicle (AAV) operating at an event venue that may use onboard sensors to collect data related to specific viewing locations (e.g., seats and/or seating locations, locations for stand-up viewing, viewing boxes, wheelchair-accessible viewing locations, etc.). The data may be used to aid in configuring the event venue and for seating selection for the purchase of tickets. For instance, in one example, images may be captured for a plurality of positions at each viewing location (e.g., different images for several heights, e.g., two feet above a seat, or above the floor, the ground, etc., five feet above, 5.5 feet above, six feet above, 6.5 feet above, etc.). In one example, the number of positions may approximate representative seating and standing views for a variety of people of different heights. In one example, audio data may also be record at each viewing location for at least one of the plurality of positions. The viewing and other data may then be used to improve a patron's ability to understand an expected experience when choosing viewing locations for an event at the event venue.

To further illustrate, a sensor-equipped AAV may be used to sense and record conditions at every viewing location at a venue. For instance, the AAV may be equipped with microphones, still cameras, video cameras, thermometers, light sensors, and other sensors. The AAV may be in communication with a viewing location management system, e.g., an event ticketing and reservation system with a database relating to each viewing location for each event. For instance, the AAV may maintain a session via a wireless access point or other network connections. The AAV may access a location mapping of every viewing location in the venue. The mapping precision may permit the AAV to define its own flight path so that every viewing location may be visited. At each viewing location the AAV may navigate itself to several positions, e.g., heights representing typical eye levels of different sized people for both sitting and standing. The flight path may include every seat or it may include only selected seats to obtain a representative sampling of viewing information (e.g., one or more images, a video clip, or the like). The images or video clips for each position for each viewing location, along with simulated patron heights, may be stored in a viewing location database.

In one example, for outdoor venues, the AAV may also capture images at different times of the day and different days of the year. These images, along with indications of the time and/or date may also be stored in the viewing location database and may be provided to patrons in connection with making viewing location selections for various events. For instance, some patrons may be interested to know which seats may be in sunlight vs. shade on a sunny day in the middle of the hot summer to help make a seat selection. In one example, a venue owner or operator, an event producer, or the like may also vary the price of sunny vs. shady seats. In one example, the AAV may be dispatched to empty seats or other viewing locations during actual events of various types to capture images and/or video to provide representative views of different event types. For instance, a view from a particular seat in an arena may be perceived differently for a hockey event versus a basketball event versus a concert, and so forth.

In one example, the AAV may further be used to test sound levels of the venue's speaker system. For instance, test audio may be played over the speaker system while the AAV traverses a flight path. The AAV may receive the test audio via one or more microphones and may record sound measurements including intensity, such as in decibels; frequency, and other measures may also be recorded. The measured level(s) may be compared against expected level(s) and adjustments may be made to the speaker system to make corrections. The test audio sensed by the AAV may also be analyzed by the AAV or sent to a controller of the speaker system to identify echo, sound clarity, and other sound quality characteristics that may be used in the speaker system adjustments. In one example, the test audio level (or actual samples of the test audio) may also be stored in the viewing location database. This may be used, for example, if the venue is a theater for hosting an orchestra where it may be useful to include sound levels and quality as an element informing a patron's viewing location selection. In one example, the AAV may also record a video of an event, perhaps a rehearsal. The video may be analyzed to determine where motion occurs over time and represent various levels of density of motion over the course of the entire event.

The collected AAV sensor data may be used to improve the viewing location selection experience and expectations of a patron. For instance, a patron may use a device to access a reservation application or website (e.g., a component of the ticketing and reservation system or in communication with the ticketing and reservation system). Using the AAV-collected sensor data in the viewing location database, the ticketing and reservation system may present an improved simulation of the experience that the patron may expect during the event. For instance, the patron may enter his or her own height to improve the accuracy of a simulated view that may be presented for the patron. For instance, the reservation system may use the patron's stated height to provide the best match of AAV-captured images for a viewing location that the patron is interested in. In addition, the ticketing and reservation system may collect data from other reservations that have already been made to permit the patron to have a better understanding of who would be seated in the area around a particular viewing location currently being viewed/considered by the patron. For example, other patrons who have reserved seats may have included data with their reservations that may be stored in the viewing location database, such as their heights, team preferences, types of fan, and other descriptors. These data and others may be used by the ticketing and reservation system to present a simulated view of the viewing location and its surroundings. For instance, one or more AAV-captured images corresponding to the patron's seating and/or standing heights at the viewing location may be provided via a viewing location selection interface of the reservation application or website of the ticketing and reservation system to the patron, which may also be enhanced with simulated audience members based upon the heights or other data provided by these other patrons. In one example, the simulated patrons may comprise silhouettes or avatars representing generic individuals. In another example, the simulated patrons may comprise AI-generated representation of patrons of particular heights, fan base type, etc. (e.g., using a generative adversarial network (GAN)-based generator, for instance).

In addition, the patron may optionally login to the ticketing and reservation system via one or more social networking applications or may provide a social network identifier when accessing the reservation application or website. In this case, the ticketing and reservation system may have access to identifiers of the patron's friends and connections. In one example, if any known contacts have existing reservations, they may also be displayed in a simulated view for a particular viewing location (and/or for other viewing locations that may also be considered by the patron). In one example, sound quality information may also be included in the viewing location selection process (and in one example, as a factor in viewing location pricing). Similarly, a motion heat map may be presented to the patron to use as another factor in viewing location selection, as a representation of visibility from a candidate viewing location as it relates to where motion (e.g., actions of team players in a sports event) is expected to occur during the event.

In one example, an event venue may provide patrons coming to an on-site box office/ticket office with AAV assisted real-time or near-real-time views from different viewing locations. For instance, a patron may be interested in a particular seat. The event venue owner or operator, or an event producer may then allow the patron (or site personnel assisting the patron), via an on-site user interface device, to cause an AAV to be dispatched to a viewing location that is selected by a patron, obtain current viewing information of at least one position at the viewing location (e.g., at a height, or seating/standing heights of the patron), and providing the current viewing information via a viewing location selection interface. Thus, the patron may obtain a timely view of the actual event in progress (or about to begin) from the considered viewing location). These and other aspects of the present disclosure are discussed in greater detail below in connection with the examples of FIGS. 1-4.

To aid in understanding the present disclosure, FIG. 1 illustrates an example system 100, related to the present disclosure. As shown in FIG. 1, the system 100 connects user device 141, server(s) 112, server(s) 125, and autonomous aerial vehicle(s) (AAVs 160), with one another and with various other devices via a core network, e.g., a telecommunication network 110, a wireless access network 115 (e.g., a cellular network), and Internet 130. It should be noted that multiple AAVs 160 can be deployed in accordance with the present disclosure but only one AAV 160 is shown in FIG. 1 for clarity purposes.

Figure 3:
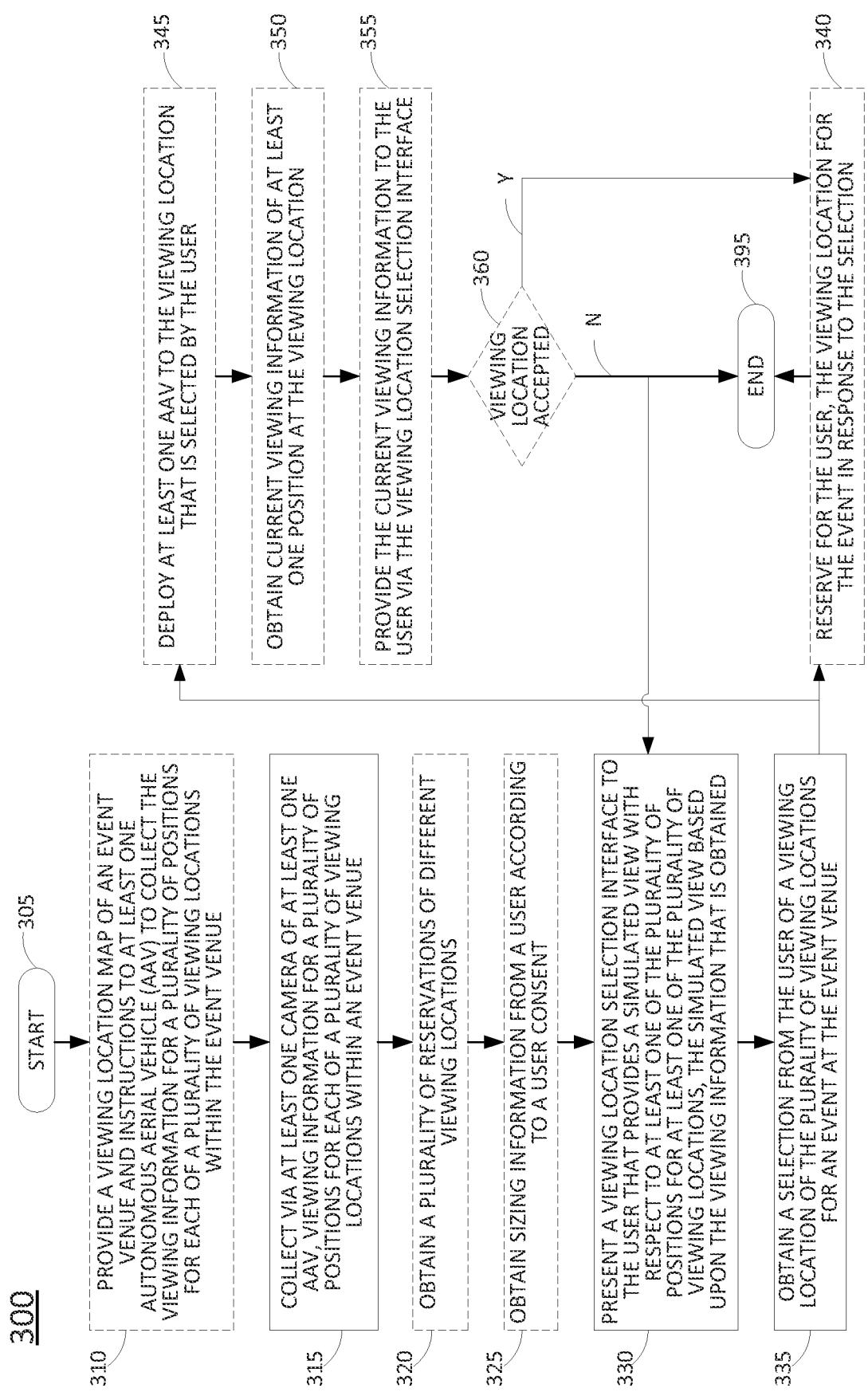
FIG. 3 illustrates a flowchart of an example method for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained.
Figure 4:
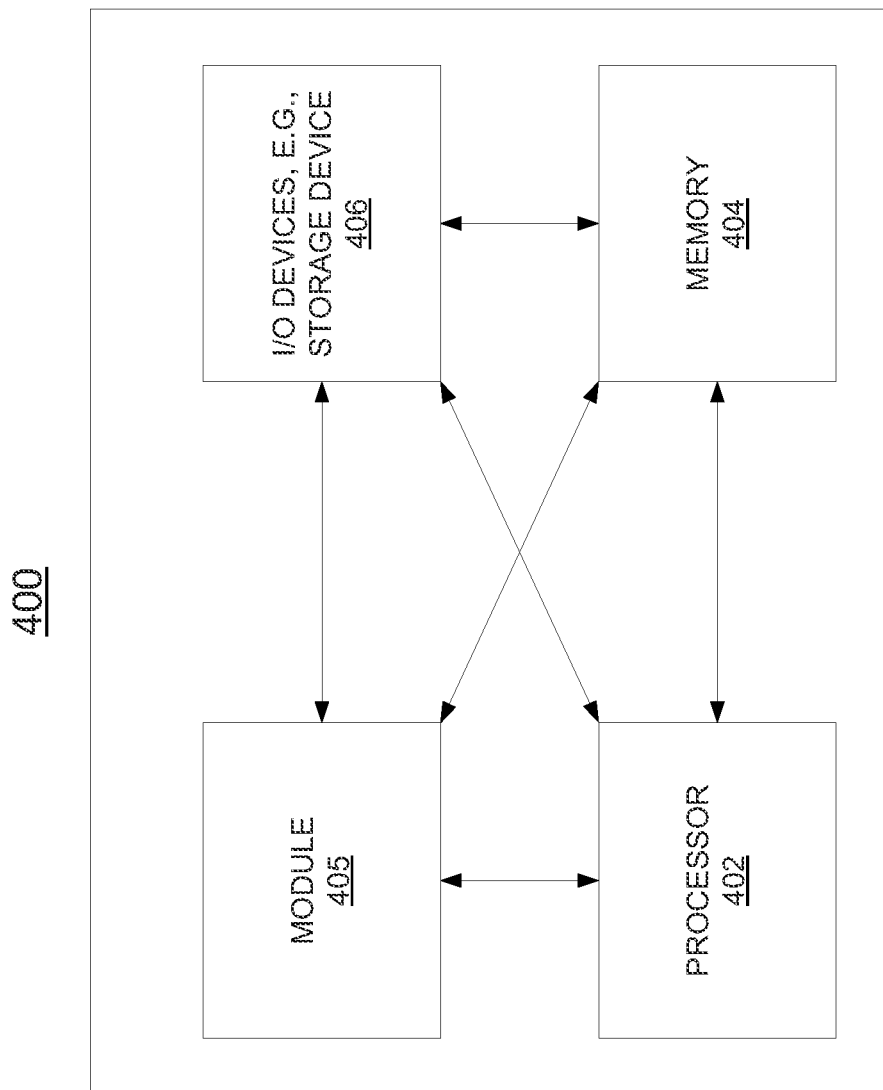
FIG. 4 illustrates an example high-level block diagram of a computing device specifically programmed to perform the steps, functions, blocks, and/or operations described herein.

In one example, the server(s) 125 may each comprise a computing device or processing system, such as computing system 400 depicted in FIG. 4, and may be configured to perform one or more steps, functions, or operations for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained. For instance, an example method for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained is illustrated in FIG. 3 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, server(s) 125 may comprise an event venue management system, which in one example may include a seating database, a reservation and ticketing system, and an AAV management system. For instance, server(s) 125 may receive and store information regarding AAVs, such as (for each AAV): an identifier of the AAV, a maximum operational range of the AAV, a current operational range of the AAV, capabilities or features of the AAV, such as maneuvering capabilities, payload/lift capabilities (e.g., including maximum weight, volume, etc.), sensor and recording capabilities, lighting capabilities, visual projection capabilities, sound broadcast capabilities, and so forth. In one example, server(s) 125 may direct AAVs in collecting viewing location data and providing real-time viewing location visual feeds to individuals or groups of people, as described herein.

In one example, server(s) 125 may store detection models that may be deployed to AAVs, such as AAV 160, in order to detect items of interest based upon input data collected via AAV sensors in an environment. For instance, in one example, AAVs may include on-board processing systems with one or more detection models for detecting objects or other items in an environment/space/area. In accordance with the present disclosure, the detection models may be specifically designed for detecting venue seats, viewing boxes, locations for stand-up viewing, wheelchair accessible viewing locations, etc. The MLMs, or signatures, may be specific to particular types of visual/image and/or spatial sensor data, or may take multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish plastic seats from a concrete floor, metal railings, etc.

As noted above, in one example, MLMs, or signatures, may take multiple types of sensor data as inputs. For instance, MLMs or signatures may also be provided for detecting particular items based upon LiDAR input data, infrared camera input data, and so on. In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the signature (e.g., a MLM). In one example, the MLM may comprise the average features representing the positive examples for an item in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item, e.g., those features which are quantitatively the most different from what is considered statistically normal or average from other items that may be detected via a same system, e.g., the top 20 features, the top 50 features, etc.

In one example, detection models (e.g., MLMs) may be deployed in AAVs, to process sensor data from one or more AAV sensor sources (e.g., cameras, LiDAR, and/or other sensors of AAVs), and to identify patterns in the features of the sensor data that match the detection model(s) for the respective item(s). In one example, a match may be determined using any of the visual features mentioned above, e.g., and further depending upon the weights, coefficients, etc. of the particular type of MLM. For instance, a match may be determined when there is a threshold measure of similarity among the features of the sensor data streams(s) and an item signature. In the present disclosure, locations for stand up viewing may have designated markings on the ground such that these locations are visually identifiable and may have an associated detection model that may detect such locations from images captured from AAV imaging sensors (and similarly for wheelchair accessible viewing locations). In one example, an AAV, such as AAV 160, may utilize on-board detection models in addition to a venue map of viewing locations, a GPS unit, and altimeter, e.g., to confirm the AAV 160 is in a correct viewing location to capture viewing information from a plurality of positions (e.g., different heights at the viewing location).

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, user devices 141, and AAV 160 may be in communication with base stations 117 and 118, which provide connectivity between AAV 160, user device 141, and other endpoint devices within the system 100, various network-based devices, such as server(s) 112, server(s) 125, and so forth. In one example, wireless access network(s) 115 may be operated by the same service provider that is operating telecommunication network 110, or one or more other service providers.

For instance, as shown in FIG. 1, wireless access network(s) 115 may also include one or more servers 112, e.g., edge servers at or near the network edge. In one example, each of the server(s) 112 may comprise a computing device or processing system, such as computing system 400 depicted in FIG. 4 and may be configured to provide one or more functions in support of examples of the present disclosure for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained. For example, one or more of the server(s) 112 may be configured to perform one or more steps, functions, or operations in connection with the example method 300 described below. For instance, telecommunication network 110 may provide an AAV management system, e.g., as a service to one or more subscribers/customers, in addition to telephony services, data communication services, television services, etc. In one example, server(s) 112 may operate in conjunction with server(s) 125. For instance, server(s) 112 may manage a fleet of AAVs that are available on-demand and may be requested to perform tasks for a variety of clients, while server(s) 125 may represent a seating database, a reservation and ticketing system, etc., e.g., operated by the event venue 190. It is noted that this is just one example of a possible distributed architecture for an AAV fleet management system and/or a network-based AAV support service. Thus, various other configurations including various data centers, public and/or private cloud servers, and so forth may be deployed. For ease of illustration, various additional elements of wireless access network(s) 115 are omitted from FIG. 1.

As illustrated in FIG. 1, user device 141 may comprise, for example, a cellular telephone, a smartphone, a tablet computing device, a laptop computer, a head-mounted computing device (e.g., smart glasses), a wireless enabled wristwatch, or any other wireless and/or cellular-capable mobile telephony and computing device (broadly, a "mobile device" or "mobile endpoint device"). In one example, user device 141 may be equipped for cellular and non-cellular wireless communication, such as 4G/Long Term Evolution-based cellular communication, 5G cellular communications, Institute of Electrical and Electronics Engineers (IEEE) 802.11 based communications (e.g., Wi-Fi, Wi-Fi Direct), IEEE 802.15 based communications (e.g., Bluetooth, Bluetooth Low Energy (BLE), and/or ZigBee communications), and so forth.

In accordance with the present disclosure, AAV 160 may include a camera 162 and one or more radio frequency (RF) transceivers 166 for cellular communications and/or for non-cellular wireless communications. In one example, AAV 160 may also include one or more module(s) 164 with one or more additional controllable components, such as one or more: microphones, loudspeakers, infrared, ultraviolet, and/or visible spectrum light sources, projectors, light detection and ranging (LiDAR) units, temperature sensors (e.g., thermometers), a global positioning system (GPS) unit, an altimeter, a gyroscope, a compass, and so forth.

In addition, AAV 160 may include an on-board processing system to perform steps, functions, and/or operations in connection with examples of the present disclosure for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained. For instance, AAV 160 may comprise all or a portion of a computing device or processing system, such as computing system 400 as described in connection with FIG. 4 below, specifically configured to perform various steps, functions, and/or operations as described herein.

In an illustrative example, the event venue 190 may utilize at least AAV 160 to navigate to each viewing location within the event venue 190 to capture viewing information (e.g., camera images, video clips, audio clips, or the like, which may include panoramic images and/or video, 360 degree images and/or video, etc.) from a plurality of different positions (e.g., heights or elevations). In one example, AAV 160 may be provided with instructions for traversing at least a portion of the event venue 190 and capturing viewing information for a plurality of positions for each of the viewing locations therein. In addition, AAV 160 may be provided with a viewing location map of the event venue with marked/identified locations of different viewing locations. AAV 160 may navigate itself to such locations using an on board GPS unit, may utilize an altimeter or the like to navigate to various positions/heights at such locations, and so forth. In one example, the map may comprise a 3D map (e.g., a LiDAR generated map/rendering of the environment of the event venue 190) containing markers of seat locations. Using its own LiDAR unit and collecting LiDAR sensor data, AAV 160 may verify its position within the event venue 190 and navigate to one or more marked viewing locations in accordance with such a map. Alternatively or in addition, AAV 160 may traverse the event venue 190 and may detect and identify different viewing locations via collection of sensor data via on-board sensors (in this case, one or more of LiDAR sensor data, optical camera sensor data (e.g., images and/or video, or the like), and applying the sensor data as input(s) to one or more detection models for detecting seats, viewing boxes, stand-up viewing locations, wheelchair accessible viewing locations, etc. In one example, the instructions and/or the map of the event venue 190 may be provided by or via the server(s) 125. For instance, server(s) 125 may be operated by or associated with the event venue 190. A venue owner or operator, an event producer, or the like may control server(s) 125 and may cause the server(s) 125 to provide the map to AAV 160, to instruct AAV 160 to commence viewing information collection at various viewing locations, etc.

For instance, as shown in FIG. 1, AAV 160 may approach a seat (section 227, row F, seat 2) at the event venue 190 in accordance with the instructions and the map of the event venue 190. The AAV 160 may then navigate itself to each of the positions/heights A, B, C, and D, and capture viewing information at each position/height. Although only four heights are illustrated, it should be understood that visual information may be captured for any number of positions/heights at a given viewing location. It should be noted that AAV 160 may repeat this procedure for any number (or all) of the viewing locations at the event venue 190. The AAV 160 may store the captured viewing information, recording the particular viewing locations and positions/heights for each such captured viewing information, and may provide all of the captured and stored data, e.g., to server(s) 125 at the end of a flight session. Alternatively, or in addition, AAV 160 may stream captured viewing information, along with labels of the viewing location and position/height for each such captured viewing information, on an ongoing basis as such data is collected during the flight session. In one example, AAV 160 may cover all viewing locations and positions of the event venue 190 in multiple flight sessions (e.g., a single battery may not permit the AAV to complete the entire event venue 190). In another example, as noted above, multiple AAVs may be dispatched at a same time or at different times, where each may be assigned a respective portion of the viewing locations for multi-position collection of viewing information (e.g., at multiple heights).

In one example, AAV 160 may also, at each viewing location, collect audio information via at least one microphone of AAV 160 for at least one of the plurality of positions. For instance, the audio information may comprise a recording of sample music, a short recording from a prior musical event or other events (e.g., crowd noise, announcements, etc. from a sporting event, or the like), and so forth. The audio information may similarly be stored and/or provided to server(s) 125 and/or server(s) 112 to be stored in a record for the viewing location in a viewing location database.

Figure 2:
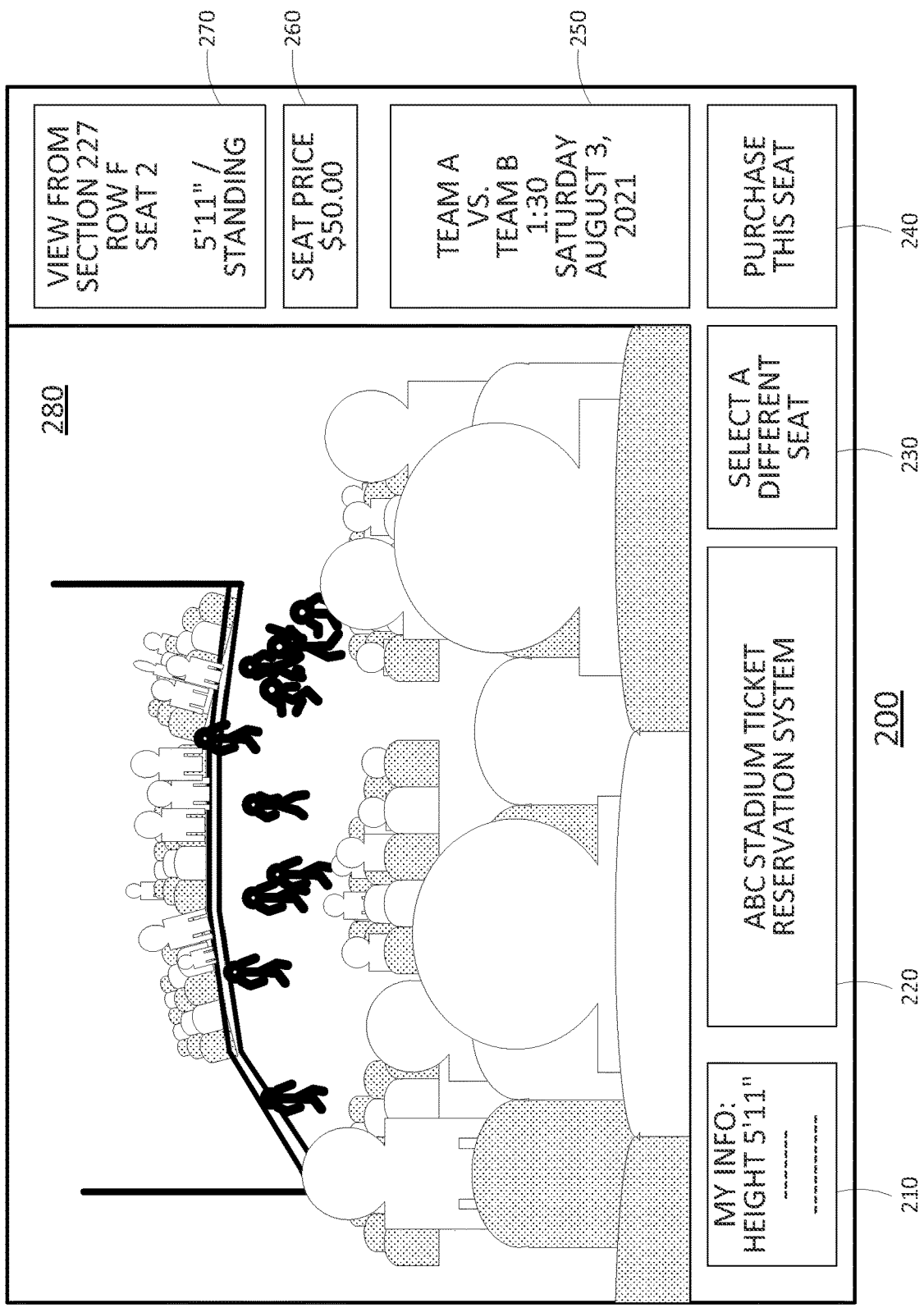
FIG. 2 illustrates example scenes of an autonomous aerial vehicle identifying candidate projection areas and selecting a candidate projection area as a projection zone for projecting informational data from the autonomous aerial vehicle, in accordance with the present disclosure.

After viewing information (or other data, such as audio information) for different positions (e.g., heights) at different viewing locations is obtained via AAV 160 and/or other AAVs, server(s) 125 and/or server(s) 112 may then provide a viewing location selection interface that provides a simulated view with respect to at least one of the plurality of positions for at least one of the plurality of viewing locations, wherein the simulated view is based upon the viewing information that is obtained. FIG. 2, discussed in greater detail below, illustrates an example viewing location selection interface in accordance with the present disclosure.

As noted above, an event venue may offer patrons real-time AAV-captured views of available viewing locations (e.g., for an event already in progress or starting soon and for which audience members are already being seated, team players are already warming up on the field, or orchestra musicians seating are already set on a stage, etc.). To illustrate, in FIG. 1, patron 140 having user device 141 may approach the event venue 190. In one example, the patron 140 may be enabled to access a real-time AAV-assisted viewing location selection interface via a website or application of the event venue (e.g., a ticketing and reservation system) when the user device 141 is detected to be near or at the event venue 190. For instance, the application or website may obtain permission of the patron 140 to track the location of the user device 141 for purposes of granting access to the real-time AAV-assisted viewing location selection interface. Via the interface, the patron 140 may select a viewing location that the patron 140 is interested in purchasing (or upgrading to if the patron already has a lower cost ticket) and may select to have an AAV, such as AAV 160 navigate to the viewing location to provide a real-time or near-real time view (e.g., from one or more still images and/or a video feed). In one example, AAV 160 may also provide an audio sample or audio feed captured at the same time at the viewing location. Thus, the patron 140 may have a better idea of what the view may be from one viewing location versus another based upon the current conditions (e.g., other audience members in the vicinity, sun/shade profile, distance to stage or event action, audio information, etc.). Similar to the foregoing examples, the patron 140 may provide his or her height, and the AAV 160 may specifically position itself at the seating and/or standing height of the patron 140 to obtain the real-time viewing information. In another example, the same or a similar service may be provided via a kiosk or via a device of a staff member of the event venue 190, e.g., at an on-site ticket office/box office. In one example, patrons may be limited to a maximum number of real-time AAV-assisted seating views for any particular event, e.g., to ensure that other patrons have an opportunity to utilize this resource. The real-time view provided by AAV 160 may be similar to the simulated view of the example of FIG. 2 (however, with actual other audience members instead of simulated audience members).

The foregoing illustrates just one example of a system in which examples of the present disclosure for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained may operate. In addition, although the foregoing example is described and illustrated in connection with a single AAV 160, a single patron 140, etc., it should be noted that various other scenarios may be supported in accordance with the present disclosure.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained. In still another example, severs(s) 112 may reside in telecommunication network 110, e.g., at or near an ingress node coupling wireless access network(s) 115 to telecommunication network 110, in a data center of telecommunication network 110, or distributed at a plurality of data centers of telecommunication network 110, etc. Additionally, devices that are illustrated and/or described as using one form of communication (such as a cellular or non-cellular wireless communications, wired communications, etc.) may alternatively or additionally utilize one or more other forms of communication. For instance, in one example, server(s) 125 may communicate with AAV 160, such as for assigning tasks to AAV 160, monitoring for task completion, etc. via a wireless access point (AP) 122. For instance, server(s) 125 may be owned or operated by the same entity owning or controlling the event venue 190, and may have one or more wireless access points, such as AP 122, deployed throughout the event venue 190. Thus, communications between server(s) 125 and AAV 160 may not traverse any networks external to the entity. For instance, AP 122 and AAV 160 may establish a session via Wi-Fi Direct, LTE Direct, a 5G D2D sidelink, a DSRC session/pairing, etc. Thus, these and other modifications are all contemplated within the scope of the present disclosure.

FIG. 2 illustrates an example viewing location selection interface 200 in accordance with the present disclosure. For instance, the viewing location selection interface 200 may be presented to a user, or patron, accessing a ticketing and reservation system of event venue 190 of FIG. 1 via a user device. For instance, the viewing location selection interface 200 may be presented via a dedicated application for the ticketing and reservation system, may be presented via a web browser accessing a webpage for the ticketing and reservation system, or the like.

In the example of FIG. 2, the viewing location selection interface 200 may include area or zones in which various information is presented, such as a user information area 210, a ticketing and reservation system identification area 220, a seat selection button 230, a seat purchase button 240, an event information section 250, a seat price section 260, and a current seat and view information zone 270. The user information area 210 may display user information, such as a user height and/or other information, such as a preferred team, a user name, etc. In one example, the user information area 210 may also be selectable via a user interface to change any of the information therein. In this case, a user may have previously input at least his or her height information (e.g., 5 feet 11 inches tall). The ticketing and reservation system identification area 220 indicates the provider of the ticketing and reservation system (which may also provide the viewing location selection interface 200 thereof), e.g., ABC Stadium. In one example, this may be the same as the event venue 190 of FIG. 1. It should be noted that although examples of the present disclosure are described herein primarily in connection with a same entity owning/controlling the event venue, collecting the visual information of different positions of various viewing locations via one or more AAVs, and providing event ticketing and reservations for the event venue, in other, further, and different examples, different entities may perform and/or provide these different aspects. For instance, one entity may, with the permission of the event venue owner, collect viewing information from various positions of various viewing locations, while yet another entity may provide ticketing and reservations for one or more events at the event venue (e.g., a third-party ticket distributor or reseller, or the like).

The event information section 250 provides information on the event that a user may be searching for tickets and/or reservations, in this case a baseball game between Team A and Team B at 1:30 PM on Saturday Aug. 3, 2021. The current seat and view information zone 270 indicates that the user is currently viewing a particular seat: section 227, row F, seat 2. In addition, the current seat and view information zone 270 indicates the user is currently viewing the visual information (in viewing area 280) from a perspective of a height of 5 feet 11 inches (e.g., standing height for the user). The visual information in viewing area 280 for this height/position may be one of a set of different visual information captured by UAV 160 of FIG. 1 from different heights/positions at the same viewing location (i.e., at section 227, row F, seat 2). In one example, current seat and view information zone 270 may also be selectable via a user interface to change the position/height information. For instance, the viewing location selection interface 200 may initially present viewing information in viewing area 280 from the perspective of the standing height of the user. However, this may be changed via a selection from the user to any other available positions/heights for the particular viewing location. If the user is satisfied with this seat and the view, as well as the price indicated in the seat price area 260, the user may reserve the seat by selecting the seat purchase button 240. If not, the user may choose the "select a different seat" button 230, which may cause a different interface screen to be provided, e.g., with an overview map of the event venue 190, or the like, from which the user may choose another seat. Alternatively, the viewing area 280 may change to an overview map or the like to similarly allow the user to select a different seat.

Notably, the viewing information presented in the viewing area 280 may comprise a simulated view comprising the viewing information that is obtained (e.g., a camera image), which is modified to include a simulation of audience members at the event, based upon a plurality of reservations of different viewing locations within the event venue. For instance, as discussed above, patron information may be collected voluntarily from other users/patrons (e.g., height information and/or other information) in connection with prior viewing location reservations that have been made for the same event. As such, the simulated view may include simulated audience members corresponding to viewing locations and user/patron information associated with such prior reservations. For instance, in the example of FIG. 2, it can be seen that the anticipated view from section 227, row F, seat 2 for a 5 foot 11 inch standing user is a nearly clear view of most of the event (there are minor possible obstructions of view from other audience members a few rows ahead and to the left and right of the center view from the viewing location). Thus, embodiments of the present disclosure allow a purchaser to obtain a great deal of viewing perspective information for a particular seat prior to purchase, thereby alleviating the frustration or uncertainty of not knowing the viewing quality of a particular seat prior to purchase.

It should be noted that the foregoing is just one example of a viewing location selection interface in accordance with the present disclosure. Thus, other, further, and different examples may be provided having different buttons or zones, different layouts, different types of information presented, and so forth. In addition, although a simulated view is shown with simulated audience members, in another example, simulated views may alternatively or additionally be provided without simulated audience members. For instance, a user may prefer to have a view that does not include such simulation. In still another example, there may be insufficient data collected regarding other audience members, or there may be an insufficient number of prior reservations. In these or other scenarios, in one example, a simulated audience may be generated based upon a prediction or forecast of a crowd, e.g., based upon past crowds/audience members for similar events. Thus, these and other modifications are all contemplated within the scope of the present disclosure.

FIG. 3 illustrates a flowchart of an example method 300 for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained. In one example, steps, functions and/or operations of the method 300 may be performed by a device or apparatus as illustrated in FIG. 1, e.g., by one or more of server(s) 125 and/or server(s) 112, or any one or more components thereof, or by server(s) 125 or servers 112, and/or any one or more components thereof in conjunction with one or more other components of the system 100, such as elements of wireless access network 115, telecommunication network 110, AAV 160, and so forth. In one example, the steps, functions, or operations of method 300 may be performed by a computing device or processing system, such as computing system 400 and/or hardware processor element 402 as described in connection with FIG. 4 below. For instance, the computing system 400 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and may proceeds to optional step 310 or to step 320.

At optional step 310, the processing system may provide a viewing location map of an event venue and instructions to the at least one AAV to collect viewing information for a plurality of positions (e.g., heights) for each of a plurality of viewing locations within the event venue.

At step 315, the processing system collects, via at least one camera of at least one AAV, viewing information for the plurality of positions for each of the plurality of viewing locations within the event venue. For instance, the plurality of viewing locations may comprise seats, viewing boxes, locations for stand-up viewing, wheelchair-accessible viewing locations, and so forth. In addition, as noted above, for each of the plurality of viewing locations, the plurality of positions may comprise a plurality of viewing heights. In one example, the at least one AAV may be configured to identify viewing locations via at least one detection model for processing imaging sensor data and detecting at least one type of viewing location. In another example, the AAV may navigate in accordance with the viewing location map and a GPS unit and altimeter of the AAV. Alternatively, or in addition, the map may comprise a 3D LiDAR generated map with markers for viewing locations thereon. The AAV may thus utilize its LiDAR unit to detect its location in space using the 3D map and its current LiDAR readings and to navigate to a destination viewing location for viewing information collection.

In one example, step 315 may further include collecting via at least one microphone of the at least one AAV, audio information for at least one of the plurality of positions for each of the plurality of viewing locations within the event venue. For instance, the audio information may comprise a recording of sample music, a short recording from a prior musical performance or other event (e.g., crowd noise, announcements, etc. from a sporting event, or the like), and so forth.

At optional step 320, the processing system may obtain a plurality of reservations of different viewing locations. In one example, optional step 320 may include obtaining sizing information of a plurality of audience members associated with the plurality of reservations.

At optional step 325, the processing system may obtain sizing information from the user according to a user consent (e.g., at least a height of an individual who is likely to occupy each particular seat, e.g., a user may purchase four seats for his or her family and the user may also specify each occupant's height for each of the four seats). For instance, the user may input this information via a user interface, such as viewing location selection interface 200. Alternatively, or in addition, the user may elect to have this information stored from a prior reservation for use in making the current or future viewing location selections.

At step 330, the processing system presents a viewing location selection interface to the user, where the viewing location selection interface provides a simulated view with respect to at least one of the plurality of positions for at least one of the plurality of viewing locations, and where the simulated view is based upon the viewing information that is obtained. In one example, the at least one of the plurality of positions for the at least one of the plurality of viewing locations is selected for the user in accordance with the sizing information of the user. In one example, the at least one of the plurality of positions comprises at least two positions, where the at least two positions comprise a standing height of the user and a calculated seated height of the user. In addition, in one example, the simulated view may comprise a simulation of audience members at the event, based upon a plurality of reservations of different viewing locations within the event venue that may be obtained at optional step 320. For instance, the simulated view may include simulated audience members having sizes corresponding to the sizing information of the plurality of audience members (e.g., with the simulated audience members being included in the simulated view at locations corresponding to the different viewing locations of the respective reservations). In addition, in one example, the viewing location selection interface may further provide audio information for the at least one of the plurality of viewing locations that may be collected at step 315.

At step 335, the processing system obtains a selection from the user of a viewing location of the plurality of viewing locations for the event at the event venue. For instance, the user may choose to reserve a particular viewing location for which a simulated view is presented at step 330. For example, the user may select a button such as the seat purchase button 240 of FIG. 2.

At optional step 340, the processing system may reserve the viewing location for the event in response to the selection. For instance, the processing system may mark the viewing location as "unavailable" in a viewing location database for the event. In addition, the processing system may charge a user account or may direct a device of the user to a payment processing system to complete the transaction, or the like.

At optional step 345, the processing system may deploy at least one AAV to the viewing location that is selected by the user. For instance, in one example, the selection of step 335 may not result in a reservation of the viewing location, but may instead cause an AAV to be dispatched to the viewing location. For instance, the viewing location selection interface of step 330 may be provided via a terminal outside the event venue and/or may be via a mobile device of the user when the mobile device is determined to be already at or within the event venue.

At optional step 350, the processing system may obtain current viewing information of at least one position at the viewing location, e.g., via a live feed from the AAV.

At optional step 355, the processing system may providing the current viewing information to the user via the viewing location selection interface. In one example, if the user is satisfied with this seat selection (e.g., as indicated by the decision step 360: "viewing location accepted?"), the method may proceed to optional step 340. Otherwise, the method may proceed back to step 330 or to step 395.

Following step 340 or one of optional steps 345 or 355, the method 300 may proceed to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example, the processing system may repeat one or more steps of the method 300, such as step 330 for different viewing locations, steps 325-340 for different users, etc. In various other examples, the method 300 may further include or may be modified to comprise aspects of any of the above-described examples in connection with FIGS. 1 and 2, or as otherwise described in the present disclosure. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components, devices, and/or systems illustrated in FIG. 1 or described in connection with FIG. 2 or 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for collecting via an autonomous aerial vehicle viewing information for a plurality of positions for a plurality of viewing locations within an event venue and presenting a viewing location selection interface that provides a simulated view with respect to at least one of the plurality of positions for at least one of the plurality of viewing locations, based upon the viewing information that is obtained (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
 collecting, by a processing system including at least one processor, via at least one camera of at least one autonomous aerial vehicle, viewing information for a plurality of positions for each of a plurality of viewing locations within an event venue, wherein for each of the plurality of viewing locations, the plurality of positions comprises a plurality of viewing heights, wherein each of the plurality of viewing locations comprises an individual seating location within the event venue, and wherein the viewing information comprises at least one captured image for each of the plurality of viewing heights at each of the plurality of viewing locations;
 presenting, by the processing system, a viewing location selection interface to a user, wherein the viewing location selection interface provides a simulated view with respect to at least one of the plurality of positions for at least one of the plurality of viewing locations, wherein the simulated view is based upon the viewing information that is obtained, wherein the viewing location selection interface includes at least one information zone for indicating a viewing location from among the plurality of viewing locations and a viewing height from among the plurality of viewing heights, wherein the simulated view is provided for the viewing height at the viewing location, and wherein the simulated view is generated from the at least one captured image for the viewing height at the viewing location;
 obtaining, by the processing system via the viewing location selection interface, a selection from the user of a particular viewing location of the plurality of viewing locations for an event at the event venue;
 deploying, by the processing system, the at least one autonomous aerial vehicle to the particular viewing location that is selected by the user;
 obtaining, by the processing system from the at least one camera of the at least one autonomous aerial vehicle, current viewing information of at least one position at the particular viewing location; and
 providing, by the processing system, the current viewing information to the user via the viewing location selection interface.

2. The method of claim 1, further comprising:
 reserving, by the processing system for the user, the particular viewing location for the event in response to the selection.

3. The method of claim 1, further comprising:
obtaining, by the processing system, sizing information from the user according to a user consent.

4. The method of claim 3, wherein the sizing information comprises a height of an occupant for the viewing location.

5. The method of claim 3, wherein the at least one of the plurality of positions for the at least one of the plurality of viewing locations is selected for the user in accordance with the sizing information.

6. The method of claim 5, wherein the at least one of the plurality of positions comprises at least two positions, wherein the at least two positions comprise a standing height and a calculated seated height based on the sizing information.

7. The method of claim 1, wherein the simulated view comprises a simulation of audience members at the event, based upon a plurality of reservations of different viewing locations of the plurality of viewing locations within the event venue.

8. The method of claim 7, further comprising:
obtaining the plurality of reservations of the different viewing locations.

9. The method of claim 8, wherein the obtaining the plurality of reservations includes obtaining sizing information of a plurality of audience members associated with the plurality of reservations.

10. The method of claim 9, wherein the simulated view includes simulated audience members having sizes corresponding to the sizing information of the plurality of audience members.

11. The method of claim 1, further comprising:
providing a viewing location map of the event venue and instructions to the at least one autonomous aerial vehicle to collect the viewing information for the plurality of positions for each of the plurality of viewing locations within the event venue.

12. The method of claim 1, wherein the at least one autonomous aerial vehicle is configured to identify viewing locations via at least one detection model for processing imaging sensor data and detecting at least one type of viewing location.

13. The method of claim 1, wherein the collecting further includes collecting via at least one microphone of the at least one autonomous aerial vehicle, audio information for at least one of the plurality of positions for each of the plurality of viewing locations within the event venue.

14. The method of claim 13, wherein the viewing location selection interface further provides the audio information for the at least one of the plurality of viewing locations.

15. The method of claim 1, wherein the event is in progress.

16. A non-transitory computer-readable medium storing instructions which, when executed by a processing system including at least one processor, cause the processing system to perform operations, the operations comprising:
collecting, via at least one camera of at least one autonomous aerial vehicle, viewing information for a plurality of positions for each of a plurality of viewing locations within an event venue, wherein for each of the plurality of viewing locations, the plurality of positions comprises a plurality of viewing heights, wherein each of the plurality of viewing locations comprises an individual seating location within the event venue, and wherein the viewing information comprises at least one captured image for each of the plurality of viewing heights at each of the plurality of viewing locations;
presenting a viewing location selection interface to a user, wherein the viewing location selection interface provides a simulated view with respect to at least one of the plurality of positions for at least one of the plurality of viewing locations, wherein the simulated view is based upon the viewing information that is obtained, wherein the viewing location selection interface includes at least one information zone for indicating a viewing location from among the plurality of viewing locations and a viewing height from among the plurality of viewing heights, wherein the simulated view is provided for the viewing height at the viewing location, and wherein the simulated view is generated from the at least one captured image for the viewing height at the viewing location;
obtaining, via the viewing location selection interface, a selection from the user of a particular viewing location of the plurality of viewing locations for an event at the event venue;
deploying the at least one autonomous aerial vehicle to the particular viewing location that is selected by the user;
obtaining, from the at least one camera of the at least one autonomous aerial vehicle, current viewing information of at least one position at the particular viewing location; and
providing the current viewing information to the user via the viewing location selection interface.

17. An apparatus comprising:
a processing system including at least one processor; and
a computer-readable medium storing instructions which, when executed by the processing system, cause the processing system to perform operations, the operations comprising:
collecting, via at least one camera of at least one autonomous aerial vehicle, viewing information for a plurality of positions for each of a plurality of viewing locations within an event venue, wherein for each of the plurality of viewing locations, the plurality of positions comprises a plurality of viewing heights, wherein each of the plurality of viewing locations comprises an individual seating location within the event venue, and wherein the viewing information comprises at least one captured image for each of the plurality of viewing heights at each of the plurality of viewing locations;
presenting a viewing location selection interface to a user, wherein the viewing location selection interface provides a simulated view with respect to at least one of the plurality of positions for at least one of the plurality of viewing locations, wherein the simulated view is based upon the viewing information that is obtained, wherein the viewing location selection interface includes at least one information zone for indicating a viewing location from among the plurality of viewing locations and a viewing height from among the plurality of viewing heights, wherein the simulated view is provided for the viewing height at the viewing location, and wherein the simulated view is generated from the at least one captured image for the viewing height at the viewing location;
obtaining, via the viewing location selection interface, a selection from the user of a particular viewing location of the plurality of viewing locations for an event at the event venue;

deploying the at least one autonomous aerial vehicle to the particular viewing location that is selected by the user;

obtaining, from the at least one camera of the at least one autonomous aerial vehicle, current viewing information of at least one position at the particular viewing location; and providing the current viewing information to the user via the viewing location selection interface.

18. The apparatus of claim 17, the operations further comprising:

reserving for the user the particular viewing location for the event in response to the selection.

19. The apparatus of claim 17, wherein the operations further comprise:

obtaining sizing information from the user according to a user consent.

20. The apparatus of claim 19, wherein the sizing information comprises a height of an occupant for the viewing location.

* * * * *